(12) United States Patent
Costin et al.

(10) Patent No.: US 9,058,419 B2
(45) Date of Patent: Jun. 16, 2015

(54) SYSTEM AND METHOD FOR VERIFYING THE INTEGRITY OF A SAFETY-CRITICAL VEHICLE CONTROL SYSTEM

(75) Inventors: Mark H. Costin, Bloomfield Township, MI (US); Ming Zhao, Northville, MI (US); Paul A. Bauerle, Fenton, MI (US); Mahesh Balike, Farmington Hills, MI (US); James T. Kurnik, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 13/461,056

(22) Filed: May 1, 2012

(65) Prior Publication Data

US 2013/0246866 A1    Sep. 19, 2013

Related U.S. Application Data

(60) Provisional application No. 61/610,696, filed on Mar. 14, 2012.

(51) Int. Cl.
*G06F 11/00* (2006.01)
*G06F 11/36* (2006.01)
*G06F 1/24* (2006.01)

(52) U.S. Cl.
CPC .............. *G06F 11/3604* (2013.01); *G06F 1/24* (2013.01)

(58) Field of Classification Search
None
See application file for complete search history.

(56) References Cited

U.S. PATENT DOCUMENTS

| 4,539,642 | A | * | 9/1985 | Mizuno et al. ................ 701/97 |
|---|---|---|---|---|
| 5,493,270 | A | * | 2/1996 | Kondo .......................... 340/438 |
| 5,602,736 | A | * | 2/1997 | Toya et al. .................... 701/45 |
| 5,897,596 | A | | 4/1999 | Kabune et al. |
| 6,230,094 | B1 | * | 5/2001 | Ohashi et al. ................ 701/107 |
| 6,330,499 | B1 | * | 12/2001 | Chou et al. ................... 701/31.4 |
| 6,625,688 | B1 | | 9/2003 | Fruehling et al. |
| 6,892,129 | B2 | | 5/2005 | Miyano |
| 7,251,551 | B2 | * | 7/2007 | Mitsueda et al. ............ 701/29.2 |
| 7,671,482 | B2 | * | 3/2010 | Tighe ............................ 307/9.1 |
| 8,155,824 | B2 | * | 4/2012 | Sakai et al. ................... 701/34.3 |
| 8,712,635 | B2 | * | 4/2014 | Hashimoto ................... 701/36 |
| 2002/0045952 | A1 | | 4/2002 | Blemel |
| 2003/0060964 | A1 | * | 3/2003 | Ozeki et al. .................. 701/114 |
| 2003/0144778 | A1 | | 7/2003 | Miyano |

(Continued)

FOREIGN PATENT DOCUMENTS

DE    10255614 A1    8/2003
DE    102005037246 A1    2/2007

OTHER PUBLICATIONS

Fruehling, Terry L.; SAE Technical Paper Series 2000-01-1052; "Delphi Secured Microcontroller Architecture"; Mar. 6-9, 2000; 14 pages.

(Continued)

*Primary Examiner* — Christopher McCarthy

(57) ABSTRACT

A control system according to the principles of the present disclosure includes an operation control module, a fault detection module, a remedial action module, and a reset module. The operation control module controls operation of a vehicle system. The fault detection module detects a fault in the operation control module when the operation control module fails an integrity test. The remedial action module takes a remedial action when the fault is detected. The reset module resets the operation control module when the fault is detected and the remedial action is not taken.

20 Claims, 3 Drawing Sheets

(56) References Cited

U.S. PATENT DOCUMENTS

| | | |
|---|---|---|
| 2004/0123201 A1 | 6/2004 | Nguyen et al. |
| 2005/0080529 A1* | 4/2005 | Hashimoto et al. ............. 701/36 |
| 2007/0168712 A1 | 7/2007 | Racunas et al. |
| 2008/0258253 A1 | 10/2008 | Fey et al. |
| 2009/0013217 A1 | 1/2009 | Shibata et al. |
| 2009/0024775 A1 | 1/2009 | Costin et al. |
| 2009/0044044 A1 | 2/2009 | Harter et al. |
| 2009/0138137 A1* | 5/2009 | Iwagami et al. .................. 701/1 |
| 2009/0217092 A1 | 8/2009 | Weiberle et al. |
| 2010/0049909 A1 | 2/2010 | Lasser |
| 2011/0190957 A1* | 8/2011 | Iwagami et al. .............. 700/293 |
| 2014/0047299 A1* | 2/2014 | Ikeda ............................ 714/764 |

OTHER PUBLICATIONS

Freescale, MPC564xL: Qorivva 32-bit MCU for Chassis and Safety Applications, http://www.freescale.com/webapp/sps/site/prod_summary.jsp?code=MPC564xL, 2004.

Freescale, MPC5746M: Qorivva 32-bit Multicore MCU for Powertrain Applications, http://www.freescale.com/webapp/sps/site/prod_summary.jsp?code=MPC5746M, 2004.

* cited by examiner

SYSTEM AND METHOD FOR VERIFYING THE INTEGRITY OF A SAFETY-CRITICAL VEHICLE CONTROL SYSTEM

CROSS-REFERENCE TO RELATED APPLICATIONS

This application claims the benefit of U.S. Provisional Application No. 61/610,696, filed on Mar. 14, 2012. The disclosure of the above application is incorporated herein by reference in its entirety.

FIELD

The present disclosure relates to systems and methods for verifying the integrity of a safety-critical vehicle control system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Control modules are implemented in a variety of systems to process data and generate control signals. Control modules are increasingly using digital processors in cars, trucks, aircrafts and other vehicles to control safety-critical functions such as braking and engine torque output. A primary processor generates control signals based on signals received from various sensors and other devices that monitor operating characteristics such as engine speed, temperature, pressure, and gear ratio. The primary processor processes signal information using an arithmetic logic unit (ALU). If a control signal becomes corrupted as a result of a defective ALU, the primary processor may command the system to take an incorrect action.

Corrupted control signals can result from other failures and/or errors associated with the primary processor and/or other components of the control module. The failures and/or errors may include random access memory (RAM) hardware failures, RAM data storage corruption, read-only memory (ROM) faults, compiler errors and/or program counter errors. Conventional systems often use a secondary processor included in the control module to detect faults in the primary processor. The secondary processor uses an ALU to perform its fault detection that is independent from the ALU used by the primary processor.

SUMMARY

A control system according to the principles of the present disclosure includes an operation control module, a fault detection module, a remedial action module, and a reset module. The operation control module controls operation of a vehicle system. The fault detection module detects a fault in the operation control module when the operation control module fails an integrity test. The remedial action module takes a remedial action when the fault is detected. The reset module resets the operation control module when the fault is detected and the remedial action is not taken.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
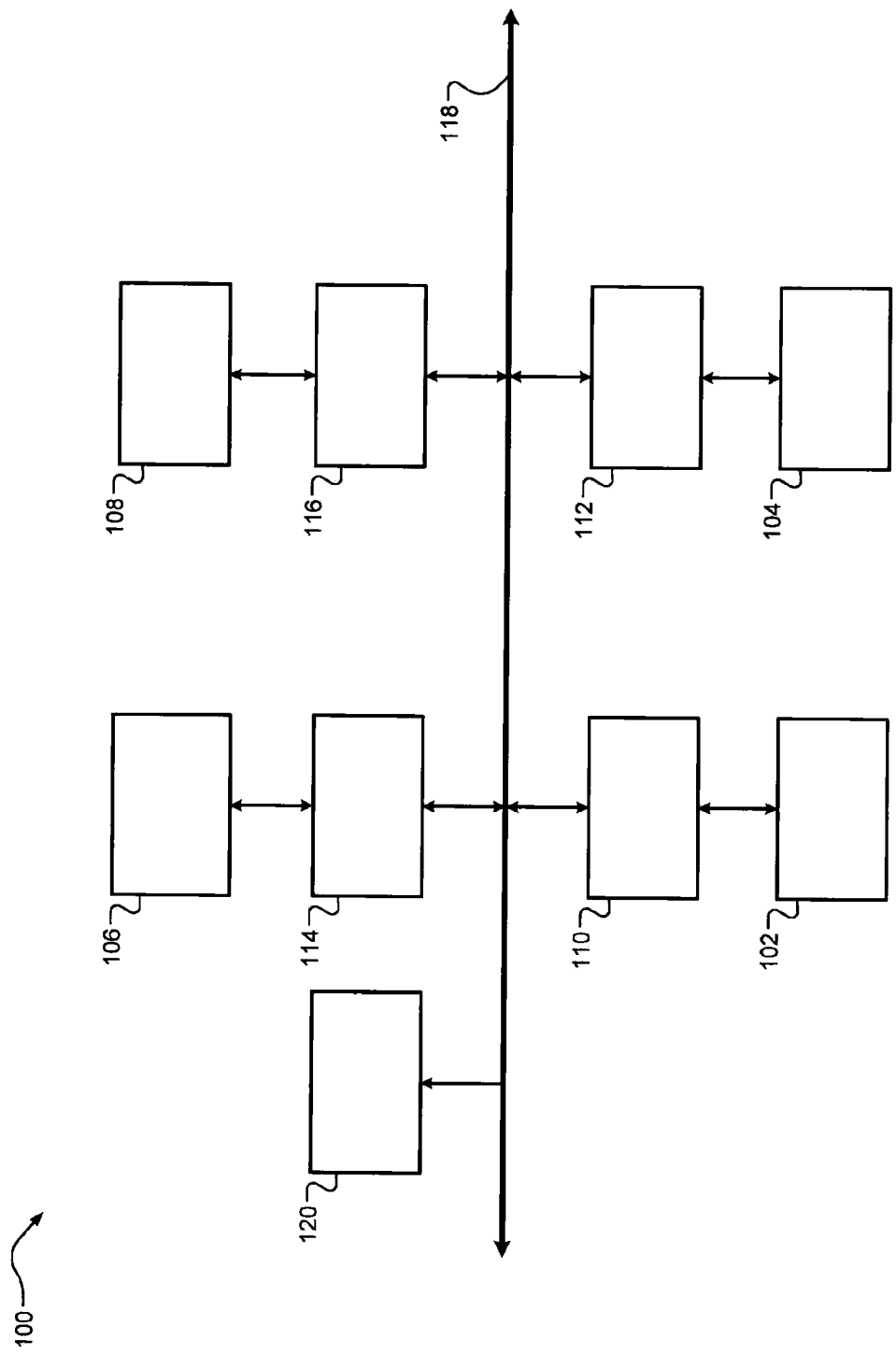
FIG. 1 is a functional block diagram of an example vehicle system according to the principles of the present disclosure.

Control systems that control vehicle systems such as an engine or vehicle brakes may be rated as automotive safety integrity level (ASIL) D systems. ASIL D control systems may include a primary processor that controls a vehicle system and a secondary processor that verifies the integrity of the primary processor. The secondary processor may send signals to the primary processor and the primary processor may send corresponding signals to the secondary processor. If the primary processor does not send corresponding signals to the secondary processor due to a fault, the secondary processor may take a remedial action such as resetting the primary processor and/or transitioning the primary processor to a safe state.

Control systems that control vehicle systems such as an electronic limited slip differential or trailer brakes may be rated as ASIL B control systems. ASIL B control systems may include a processor that controls a vehicle system and a watchdog timer that verifies the integrity of the processor by verifying that certain processes are completed within a time window. Verifying the integrity of a processor using a watchdog timer instead of a secondary processor may reduce cost. The processor may service the watchdog timer at a predetermined interval. If the processor does not service the watchdog timer at the predetermined interval due to a fault such as a hang, the watchdog timer resets the processor. The vehicle system is in a safe state when the processor is reset.

In some instances, a processor may continue to service a watchdog timer even if a fault prevents the system from transitioning to a safe state. For example, a fault may cause the processor to skip a routine that contains instructions for a remedial action, and therefore the processor may not take the remedial action. This issue may be avoided by resetting the processor as soon as a fault is identified. However, this may cause the processor to continuously reset, which may prevent reflashing the processor, retrieving fault codes from the processor, and/or debugging the processor.

A system and method according to the principles of the present disclosure may only reset a processor when both a fault is detected and a remedial action is not taken. The fault may be detected while performing an integrity test such as a program sequence watch test, a checksum test, a stack overflow test, an arithmetic logic unit test, or a configuration register test. The remedial action may include transitioning to a safe state and/or activating a service indicator. In the safe state, the processor may limit actuation of a vehicle system or disable a vehicle system. The processor may be reset by directly forcing a reset or instructing the processor to stop servicing a watchdog timer.

A system and method according to the principles of the present disclosure may verify the integrity of a processor using a watchdog timer while avoiding issues typically associated with a watchdog timer such as those discussed above. Resetting a processor when a fault is detected and a remedial action is not taken ensures that the processor transitions to a safe state when a fault prevents the processor from doing so. Allowing the processor to take a remedial action before resetting the processor prevents the processor from continuously resetting.

Referring now to FIG. 1, a vehicle system 100 includes an engine 102, a transmission 104, an electronic limited slip differential (eLSD) 106, and trailer brakes 108. An engine control module 110 controls the engine 102, a transmission control module 112 controls the transmission 104, an eLSD control module 114 controls the eLSD 106, and a trailer brake control module 116 controls the trailer brakes 108. The engine control module 110, the transmission control module 112, the eLSD control module 114, and the trailer brake control module 116 communicate with each other using a vehicle bus 118 such as a controller area network (CAN) bus.

The engine control module 110, the transmission control module 112, the eLSD control module 114, or the trailer brake control module 116 may activate a service indicator 120 using, for example, the vehicle bus 118. The service indicator 120 delivers a visual message (e.g. text), an audible message, and/or a tactile message (e.g., vibration) indicating that the vehicle system 100 requires service. The service indicator 120 may be activated when a fault is detected in the vehicle system 100.

Figure 2:
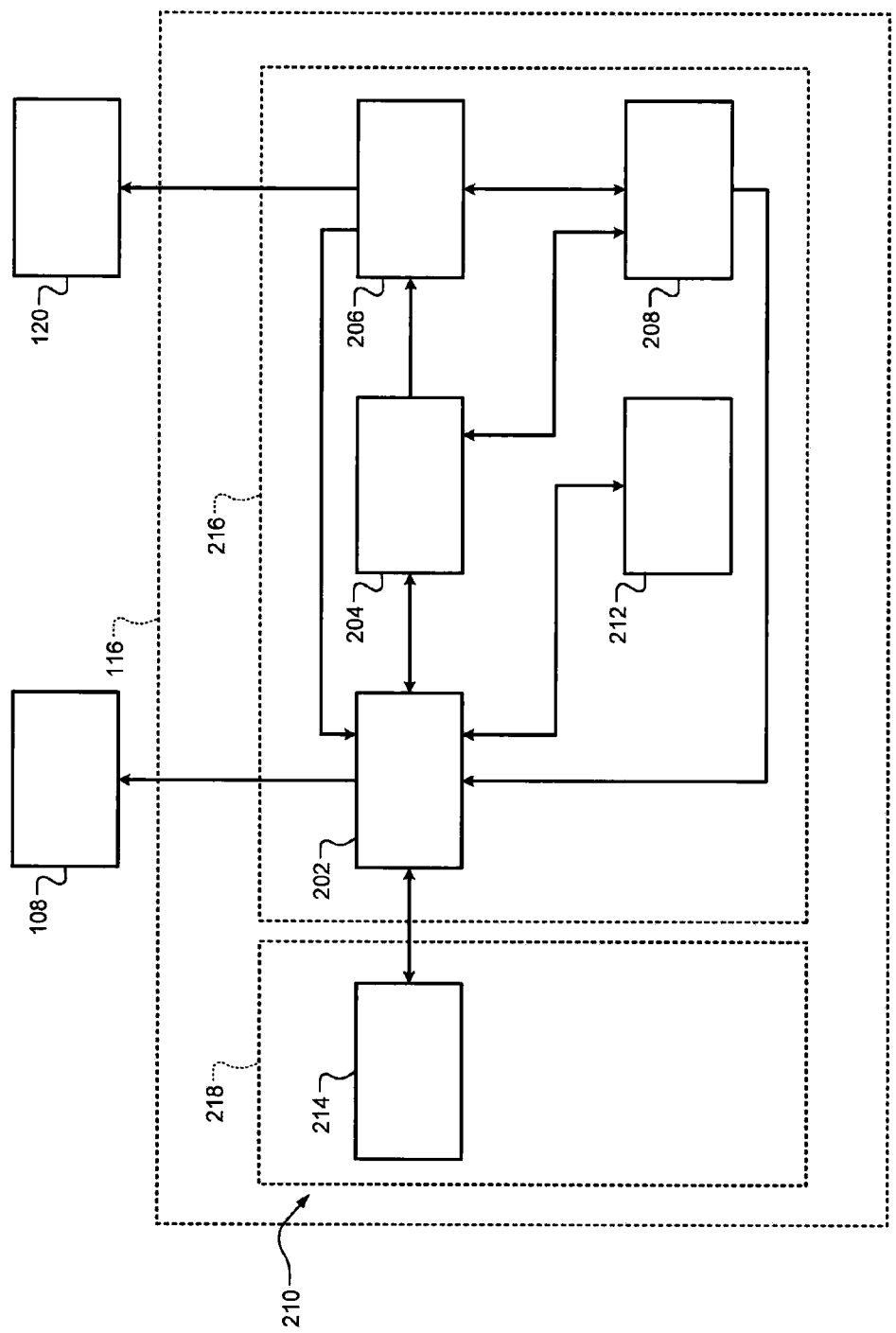
FIG. 2 is a functional block diagram of an example control system according to the principles of the present disclosure.

Referring now to FIG. 2, an example of the trailer brake control module 116 is shown in further detail. Although FIG. 2 illustrates the trailer brake control module 116, features of the trailer brake control module 116 may be included in the engine control module 110, the transmission control module 112, and/or the eLSD control module 114 of FIG. 1. In addition, the vehicle system 100 of FIG. 1 may include control modules that control other vehicle subsystems such as steering, suspension, or a fuel system, and these control modules may include features of the trailer brake control module 116.

As illustrated in FIG. 2, the trailer brake control module 116 includes an operation control module 202, a fault detection module 204, a remedial action module 206, a reset module 208, and a watchdog timer system 210. The watchdog timer system 210 includes a watchdog timer module 212 and a watchdog timer module 214, one or both of which may perform tasks performed by the watchdog timer system 210. The watchdog timer module 212 is integrated into a first chip 216 with the operation control module 202, the fault detection module 204, remedial action module 206, and the reset module 208. The watchdog timer module 214 is integrated into a second chip 218 that is separate from the first chip 216 so that a fault in one of the chips 216, 218 does not affect both of the watchdog timer modules 212, 214.

The operation control module 202 stores, retrieves, and executes instructions to perform the basic arithmetical, logical, and input/output operations involved in controlling the trailer brakes 108. The fault detection module 204 performs a number of integrity tests to verify the integrity of the operation control module 202. The integrity tests may include a program sequence watch test, a checksum test, a stack overflow test, an arithmetic logic unit (ALU) test, and/or a configuration register test. The fault detection module 204 detects a fault when the operation control module 202 fails one of the integrity tests. Additionally, the fault detection module 204 may detect a fault when the watchdog timer system 210 continuously resets the operation control module 202. The fault detection module 204 outputs a signal indicating whether a fault is detected.

The program sequence watch test ensures that certain operations are performed in a certain order. The checksum test uses a checksum to ensure that data stored in memory is not altered. The stack overflow test determines whether the amount of memory used in a call stack is greater than expected, causing a stack overflow. The ALU test detects faults in the operation control module 202 that corrupt arithmetic and logic operations. The configuration register test evaluates input/output (I/O) configuration registers within the operation control module 202.

The remedial action module 206 takes a remedial action when the fault detection module 204 detects a fault. The remedial action may include transitioning the operation control module 202 to a safe state and/or activating the service indicator 120. In the safe state, the operation control module 202 may limit actuation of the trailer brakes 108 or disable the trailer brakes 108. Other control modules may limit or disable other vehicle systems when in the safe state. For example, the engine control module 110 may limit spark generation, throttle area, and/or fueling rate when the engine control module 110 in a safe state. The remedial action module 206 outputs a signal indicating whether the remedial action is taken.

The reset module 208 resets the operation control module 202 when the fault detection module 204 detects a processor integrity fault and the remedial action module 206 does not take a remedial action. The reset module 208 may reset the operation control module 202 when a remedial action is not taken and a predetermined period has elapsed after a processor integrity fault is detected. The reset module 208 may execute a running reset to preserve in memory actions taken before the reset. The reset module 208 may actively reset the operation control module 202 by sending a reset signal to the operation control module 202 or toggling an internal reset line. Alternatively, the reset module 208 may passively reset the operation control module 202 by instructing the operation control module 202 to stop servicing the watchdog timer system 210.

The operation control module 202 services the watchdog timer system 210 (e.g., the watchdog timer module 212 and/or the watchdog timer module 214) at a predetermined interval. If the operation control module 202 does not service the watchdog timer system 210 at the predetermined interval, the watchdog timer system 210 resets the operation control module 202 by, for example, toggling a reset line. Thus, if the reset module 208 instructs the operation control module 202 to stop servicing the watchdog timer system 210 and the predetermined interval elapses, the watchdog timer system 210 resets the operation control module 202. The watchdog timer module 212 may toggle an internal reset line and the watchdog timer module 214 may toggle an external reset line. If the watchdog timer modules 212, 214 conflict as to whether to reset the operation control module 202, the resetting module may prevail.

The operation control module 202, the fault detection module 204, the remedial action module 206, the reset module 208, and the watchdog timer system 210 may execute separate routines in parallel with one another. In turn, a fault in the operation control module 202 may not prevent the fault detection module 204, the remedial action module 206, the reset module 208, and the watchdog timer system 210 from performing their respective tasks. For example, a fault in the operation control module 202 may not prevent the fault detection module 204 from detecting a processor integrity fault or prevent the remedial action module 206 from taking a remedial action.

The operation control module 202 may execute a first routine at a first loop rate (e.g., 12.5 milliseconds) to control the trailer brakes 108. The fault detection module 204 may execute a second routine at a second loop rate (e.g., 50 milliseconds) to perform the integrity tests. The fault detection module 204 may execute the second routine in parallel with the first routine. The reset module 208 may execute a third routine at a third loop rate (e.g., 6.25 milliseconds) to determine whether to reset the operation control module 202. The reset module 208 may execute the third routine in parallel with the first routine.

Figure 3:
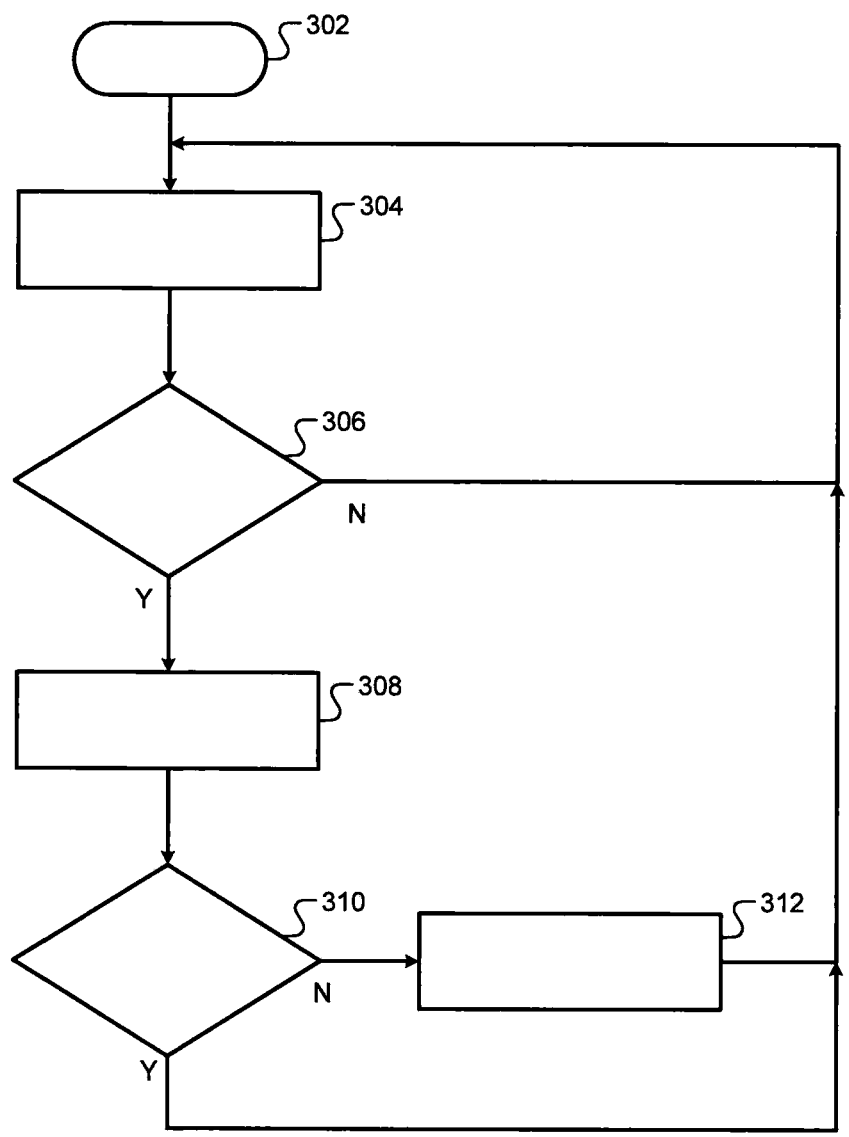
FIG. 3 is a flowchart illustrating an example control method according to the principles of the present disclosure.

Referring now to FIG. 3, a method for verifying the integrity of a control system that controls a vehicle system begins at 302. The control system may include a processor and a watchdog timer. At 304, the method performs a number of integrity tests on the processor. The integrity tests may include a program sequence watch test, a checksum test, a stack overflow test, an arithmetic logic unit (ALU) test, and/or a configuration register test.

At 306, the method determines whether a processor integrity fault is detected. The method may detect a processor integrity fault while performing one of the integrity tests. If a processor integrity fault is detected, the method continues at 308. Otherwise, the method continues at 304. At 308, the method takes a remedial action. The remedial action may include transitioning the control system to a safe state and/or activating a service indicator. In the safe state, the control system may limit actuation of the vehicle system or disable the vehicle system.

At 310, the method determines whether the remedial action is taken. The method may determine whether the remedial action is taken within a predetermined period after a processor integrity fault is detected. If the remedial action is taken, for example, within the predetermined period, the method continues at 304. Otherwise, the method continues at 312. At 312, the method resets the processor. The method may actively reset the processor. Alternatively, the method may passively reset the processor by ensuring that the processor stops servicing the watchdog timer.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A control system comprising:
   an operation control module that controls operation of a vehicle system;
   a fault detection module that detects a fault in the operation control module when the operation control module fails an integrity test;
   a remedial action module that takes a remedial action when the fault is detected; and
   a reset module that resets the operation control module when (i) the fault is detected and (ii) the remedial action is not taken, wherein the remedial action includes at least one of (i) activating a service indicator and (ii) disabling the vehicle system.

2. The control system of claim 1, wherein the remedial action includes activating the service indicator.

3. A control system comprising:
   an operation control module that controls operation of a vehicle system;
   a fault detection module that detects a fault in the operation control module when the operation control module fails an integrity test;
   a remedial action module that takes a remedial action when the fault is detected; and
   a reset module that resets the operation control module when (i) the fault is detected and (ii) the remedial action is not taken, wherein the remedial action includes disabling the vehicle system.

4. The control system of claim 3, further comprising a watchdog timer module that resets the operation control module when the operation control module does not service the watchdog timer module at a predetermined interval.

5. The control system of claim 4, wherein the operation control module, the fault detection module, the remedial action module, the reset module, and the watchdog timer module are integrated into a first chip.

6. The control system of claim 5, wherein the watchdog timer module includes a first watchdog timer module and a second watchdog timer module, the first watchdog timer module is integrated into the first chip, and the second watchdog timer module is integrated into a second chip that is separate from the first chip.

7. The control system of claim 4, wherein the reset module resets the operation control module by instructing the operation control module to stop servicing the watchdog timer module.

8. The control system of claim 4, wherein the reset module resets the operation control module by executing an internal reset.

9. The control system of claim 3, wherein the integrity test includes a program sequence watch test, a checksum test, a stack overflow test, an arithmetic logic unit test, and a configuration register test.

10. The control system of claim 3, wherein the operation control module controls the vehicle system by executing a first routine and the fault detection module performs the integrity test by executing a second routine in parallel with the first routine.

11. The control system of claim 10, wherein the reset module determines whether to reset the operation control module by executing a third routine in parallel with the first routine.

12. A method comprising:
controlling operation of a vehicle system using an operation control module;
detecting a fault in the operation control module when the operation control module fails an integrity test;
taking a remedial action when the fault is detected; and
resetting the operation control module when (i) the fault is detected and (ii) the remedial action is not taken, wherein the remedial action includes at least one of (i) activating a service indicator and (ii) disabling the vehicle system.

13. The method of claim 12, wherein the remedial action includes activating the service indicator.

14. A method comprising:
controlling operation of a vehicle system using an operation control module;
detecting a fault in the operation control module when the operation control module fails an integrity test;
taking a remedial action when the fault is detected; and
resetting the operation control module when (i) the fault is detected and (ii) the remedial action is not taken, wherein the remedial action includes disabling the vehicle system.

15. The method of claim 14, further comprising resetting the operation control module when the operation control module does not service a watchdog timer module at a predetermined interval.

16. The method of claim 14, further comprising resetting the operation control module by instructing the operation control module to stop servicing a watchdog timer module.

17. The method of claim 14, further comprising resetting the operation control module by executing an internal reset.

18. The method of claim 14, wherein the integrity test includes a program sequence watch test, a checksum test, a stack overflow test, an arithmetic logic unit test, and a configuration register test.

19. The method of claim 14, further comprising controlling the vehicle system by executing a first routine and performing the integrity test by executing a second routine in parallel with the first routine.

20. The method of claim 19, further comprising determining whether to reset the operation control module by executing a third routine in parallel with the first routine.

* * * * *